(12) United States Patent
Tokimasa et al.

(10) Patent No.: US 8,370,042 B2
(45) Date of Patent: Feb. 5, 2013

(54) VEHICLE SPEED CONTROL DEVICE AND METHOD

(75) Inventors: Mitsuhiro Tokimasa, Kariya (JP); Hajime Kumabe, Kariya (JP); Syotarou Fukuda, Obu (JP); Yasuhiro Nakai, Kariya (JP); Satoshi Niwa, Nagoya (JP); Hiroyuki Kodama, Kariya (JP); Masayoshi Takeda, Kariya (JP); Shintaro Osaki, Nisshin (JP); Kazunori Kadowaki, Nagoya (JP)

(73) Assignees: Denso Corporation, Kariya (JP); Advics Co., Ltd., Kariya (JP)

( * ) Notice: Subject to any disclaimer, the term of this patent is extended or adjusted under 35 U.S.C. 154(b) by 1030 days.

(21) Appl. No.: 12/217,900

(22) Filed: Jul. 9, 2008

(65) Prior Publication Data

US 2009/0048755 A1    Feb. 19, 2009

(30) Foreign Application Priority Data

Jul. 11, 2007    (JP) .................. 2007-182340

(51) Int. Cl.
  *B60K 31/04* (2006.01)
  *G06F 17/00* (2006.01)
(52) U.S. Cl. ................. 701/94; 701/70; 701/93
(58) Field of Classification Search .......... 701/70, 701/93, 94; 180/170
  See application file for complete search history.

(56) References Cited

U.S. PATENT DOCUMENTS

| | | | | | |
|---|---|---|---|---|---|
| 4,240,015 | A | * | 12/1980 | White ..................... | 388/806 |
| 5,048,631 | A | * | 9/1991 | Etoh ..................... | 180/179 |
| 5,392,215 | A | | 2/1995 | Morita | |
| 5,625,558 | A | * | 4/1997 | Togai et al. ............... | 701/93 |
| 6,169,949 | B1 | * | 1/2001 | Sato ..................... | 701/51 |
| 6,295,500 | B1 | * | 9/2001 | Cullen et al. ............. | 701/93 |
| 6,306,062 | B1 | * | 10/2001 | Toukura et al. ........... | 477/107 |
| 6,405,120 | B1 | * | 6/2002 | Higashimata et al. ...... | 701/96 |
| 6,554,091 | B2 | * | 4/2003 | Mianzo et al. ........... | 180/197 |

(Continued)

FOREIGN PATENT DOCUMENTS

| | | |
|---|---|---|
| JP | 61-285139 | 12/1986 |
| JP | 62-261545 | 11/1987 |

(Continued)

OTHER PUBLICATIONS

Office Action dated May 14, 2010 in German Application No. 10 2008 032 506.6 with English translation thereof.

(Continued)

*Primary Examiner* — John Q Nguyen
*Assistant Examiner* — Rodney P King
(74) *Attorney, Agent, or Firm* — Harness, Dickey & Pierce, PLC (57) ABSTRACT

A vehicle speed control device calculates a desired axle torque for maintaining a speed of a vehicle to a set speed, and conducts cruise control. Specifically, the vehicle speed control device calculates a drive force including a feedforward component corresponding to the set speed and a travel resistance against the travel of the vehicle, and a feedback component corresponding to a deviation of the set speed from the actual speed of the vehicle as a desired axle torque. The vehicle speed control device interrupts the cruise control when a requested drive axle torque requested by an accelerator operation during the cruise control exceeds the desired axle torque, and restarts the cruise control when the requested drive axle torque becomes lower than the desired axle torque.

7 Claims, 8 Drawing Sheets

U.S. PATENT DOCUMENTS

| | | |
|---|---|---|
| 6,650,990 B2 | 11/2003 | Yamamura et al. |
| 7,050,898 B2 | 5/2006 | Ono et al. |
| 7,069,136 B2 * | 6/2006 | Assaf et al. ............... 701/93 |
| 7,162,353 B2 * | 1/2007 | Minowa et al. ............ 701/96 |
| 7,548,812 B2 * | 6/2009 | Guenthner et al. ......... 701/93 |
| 7,792,624 B2 * | 9/2010 | Nakamura et al. ......... 701/72 |
| 7,801,658 B2 * | 9/2010 | Ohshima ..................... 701/93 |
| 2002/0138190 A1 * | 9/2002 | Hellmann et al. .......... 701/78 |
| 2002/0169538 A1 | 11/2002 | Yamamura et al. |
| 2004/0068359 A1 | 4/2004 | Neiss et al. |
| 2007/0005218 A1 * | 1/2007 | Ueyama ...................... 701/96 |
| 2007/0067087 A1 | 3/2007 | Ohshima |

FOREIGN PATENT DOCUMENTS

| | | |
|---|---|---|
| JP | 01-202539 | 8/1989 |
| JP | 06-064461 | 3/1994 |
| JP | 08-113057 | 5/1996 |
| JP | 08-183365 | 7/1996 |
| JP | 08-192657 | 7/1996 |
| JP | 08-253056 | 10/1996 |
| JP | 2001-328456 | 11/2001 |
| JP | 2003-054395 | 2/2003 |
| JP | 2004-142702 | 5/2004 |
| JP | 2006-219066 | 8/2006 |

OTHER PUBLICATIONS

Office Action mailed Mar. 5, 2012 in a corresponding Chinese application No. 200810126889.2 with English translation thereof.
Office Action mailed Oct. 11, 2011 in a corresponding Japanese application No. 2007-182340 with English translation thereof.
Office Action dated Jul. 4, 2012 in corresponding Chinese Application No. 200810126889.2 with English translation.

* cited by examiner

VEHICLE SPEED CONTROL DEVICE AND METHOD

CROSS REFERENCE TO RELATED APPLICATION

This application is based on and incorporates herein by reference Japanese Patent Application No. 2007-182340 filed on Jul. 11, 2007.

FIELD OF THE INVENTION

The present invention relates to a vehicle speed control device and method that conducts a cruise control to maintain a vehicle travel speed to a set travel speed.

BACKGROUND OF THE INVENTION

A conventional vehicle speed control device conducts cruise control (constant speed control) that maintains a travel speed of a vehicle to a set travel speed.

For example, in JP 8-192657A, a desired opening position of a throttle valve for the cruise control is changed to a given opening position (for example, a fully closed position).

Also, in JP 6-64461A (U.S. Pat. No. 5,392,215), a travel resistance of the vehicle is detected based on an engine output torque and acceleration, an optimum control gain is determined according to a travel resistance, and a throttle valve is controlled with a desired throttle opening position based on the control gain.

In the above vehicle speed control devices, when accelerator operation is conducted by a driver under a cruise control, and a requested acceleration that is requested by the accelerator operation exceeds a control acceleration made by the cruise control (acceleration override state), the accelerator operation is prioritized. That is, the cruise control is interrupted during the acceleration override.

The cruise control is restarted or resumed at a time when the acceleration override state is canceled, and the vehicle speed is reduced to the set speed. This speed reduction will cause uncomfortable feeling to the driver. More specially, the speed reduction becomes excessive under the condition where the travel resistance is large with the result that the vehicle speed becomes lower than the set speed. When acceleration is conducted in order to increase the lowered vehicle speed to the set speed from that state, hunting (vibration) occurs in the vehicle speed. On the contrary, the speed reduction will be insufficient under the condition where the travel resistance is small. As a result, the travel speed remains to exceed the set speed. When the travel speed is reduced to the set speed from that state, hunting also occurs in the vehicle speed.

In JP 8-192657A, the travel resistance in the travel of the vehicle is not taken into consideration. In JP 6-64461A (U.S. Pat. No. 5,392,215), a speed reduction control at the time of canceling the acceleration override state is not taken into consideration. Therefore, the above hunting is caused.

SUMMARY OF THE INVENTION

It is an object of the present invention to provide a vehicle speed control device and method which conducts a speed reduction control that reduces driver's uncomfortable feeling at the time of canceling an acceleration override state.

According to one aspect, a vehicle speed control device restarts a cruise control at a time when a requested drive force is made lower than a control drive force, after the requested drive force requested by the accelerator operation exceeds the control drive force when the accelerator operation is conducted by a driver during the cruise control. In this case, the control drive force includes a feedforward component corresponding to a travel resistance of a vehicle, and the control drive force changes according to the travel resistance.

As a result, a time when the requested drive force becomes lower than the control drive force (acceleration override state is canceled) changes according to the travel resistance. Thus, even when the travel resistance changes during the acceleration override, the cruise control restarts at an appropriate time corresponding to the travel resistance, and the control drive force in this situation is suited according to the travel resistance. Accordingly, the speed reduction after the acceleration override state has been canceled is smoothly conducted, so that the driver will not have uncomfortable feeling.

In this instance, the travel resistance is directed to, for example, an air resistance, a rolling resistance, an acceleration resistance, and a slope resistance (a inclination or gradient of the road on which the vehicle travels). Among them, the slope resistance greatly changes according to a travel road, and influence on the speed reduction control is particularly large. Under the above circumstances, the vehicle speed control device may detect at least the slope resistance as the travel resistance. The air resistance, the rolling resistance, and the acceleration resistance may be taken into consideration in addition to the slope resistance.

Preferably, a given limit may be imposed on the slope of the road (roadway) on which the vehicle travels under the Road Construction Ordinance (Law, Regulation or the like). Accordingly, when a detected value of the road slope does not fall within a limit range that is determined by the Road Construction Ordinance, it may be determined that the detected value is not the slope of the road (for example, a step is erroneously detected as the slope). Under the circumstances, the vehicle speed control device may not use the detected value in calculation of the feedforward component or uses a value resulting from limiting the detected value within the limit range when the detected value of the road slope does not fall within the limit range that is determined by the Road Construction Ordinance. With the above configuration, the calculation result of the control drive force may be determined more appropriately.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
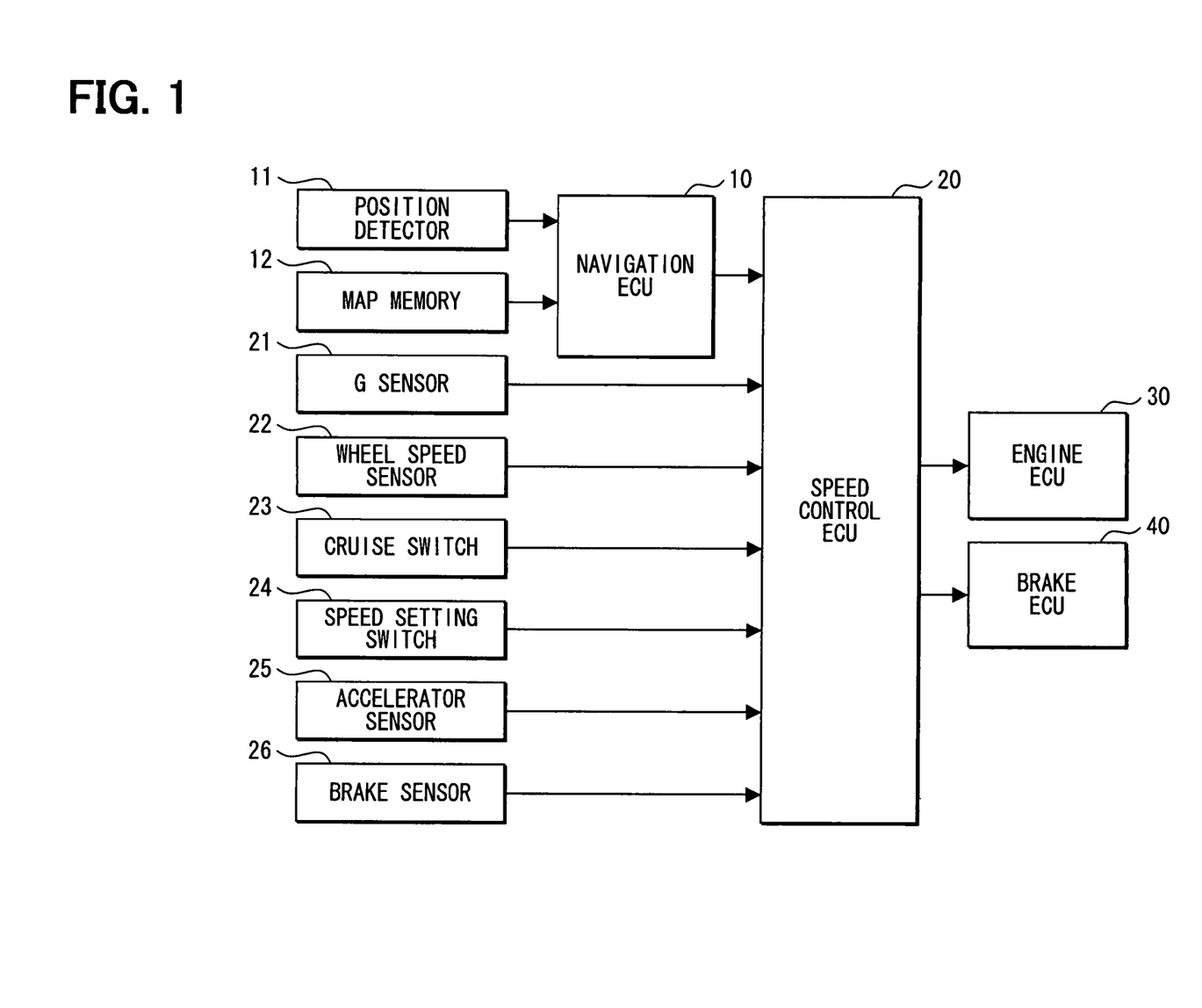
FIG. 1 is a block diagram showing a vehicle speed control device according to an embodiment of the present invention.

A vehicle speed control device is incorporated into a vehicle, and mainly includes a vehicle speed control ECU (an electronic control unit including a microcomputer and associated circuits, etc.) 20. More specifically, the vehicle speed control ECU 20 inputs information from a navigation ECU 10, a G sensor 21, a wheel speed sensor 22, a cruise switch (constant speed travel switch) 23, a vehicle speed setting switch 24, an accelerator pedal operation quantity sensor (accelerator sensor) 25, and a brake pedal operation quantity sensor (brake sensor) 26.

The navigation ECU 10 specifies a position of the vehicle on a map, and conducts processing such as route guide. For this reason, the navigation ECU 10 inputs information from a position detector 11 that detects the present position of the vehicle from a GPS receiver, a gyroscope, and a distance sensor which are not shown, and a map information storage unit (map memory) 12 that stores map information therein. The navigation ECU 10 outputs information on the limit speed of a road on which the vehicle travels to the vehicle speed control ECU 20 as information on that road.

The G sensor 21 detects acceleration of the vehicle in an anteroposterior direction (longitudinal or front-rear direction). The wheel speed sensor 22 detects the rotating speeds of the respective wheels of the vehicle, and the vehicle speed and the acceleration are calculated based on the detected value. The constant speed travel switch 23 allows a driver to conduct the start operation and the end operation of the cruise control. The vehicle speed setting switch 24 allows the driver to conduct the operation of setting a set speed (desired vehicle travel speed) of a cruise control. The accelerator pedal operation quantity sensor 25 and the brake pedal operation quantity sensor 26 detect the respective operation quantities of the accelerator operation and the brake operation of the driver.

The vehicle speed control ECU 20 calculates an axle torque for maintaining the actual travel speed of the vehicle to the set speed based on the various input information, and outputs the calculated axle toque to the engine ECU 30 and the brake ECU 40. The engine ECU 30 and the brake ECU 40 thus control a drive force and a brake force in accordance with the axle torque that is input from the speed control ECU 20.

Figure 2:
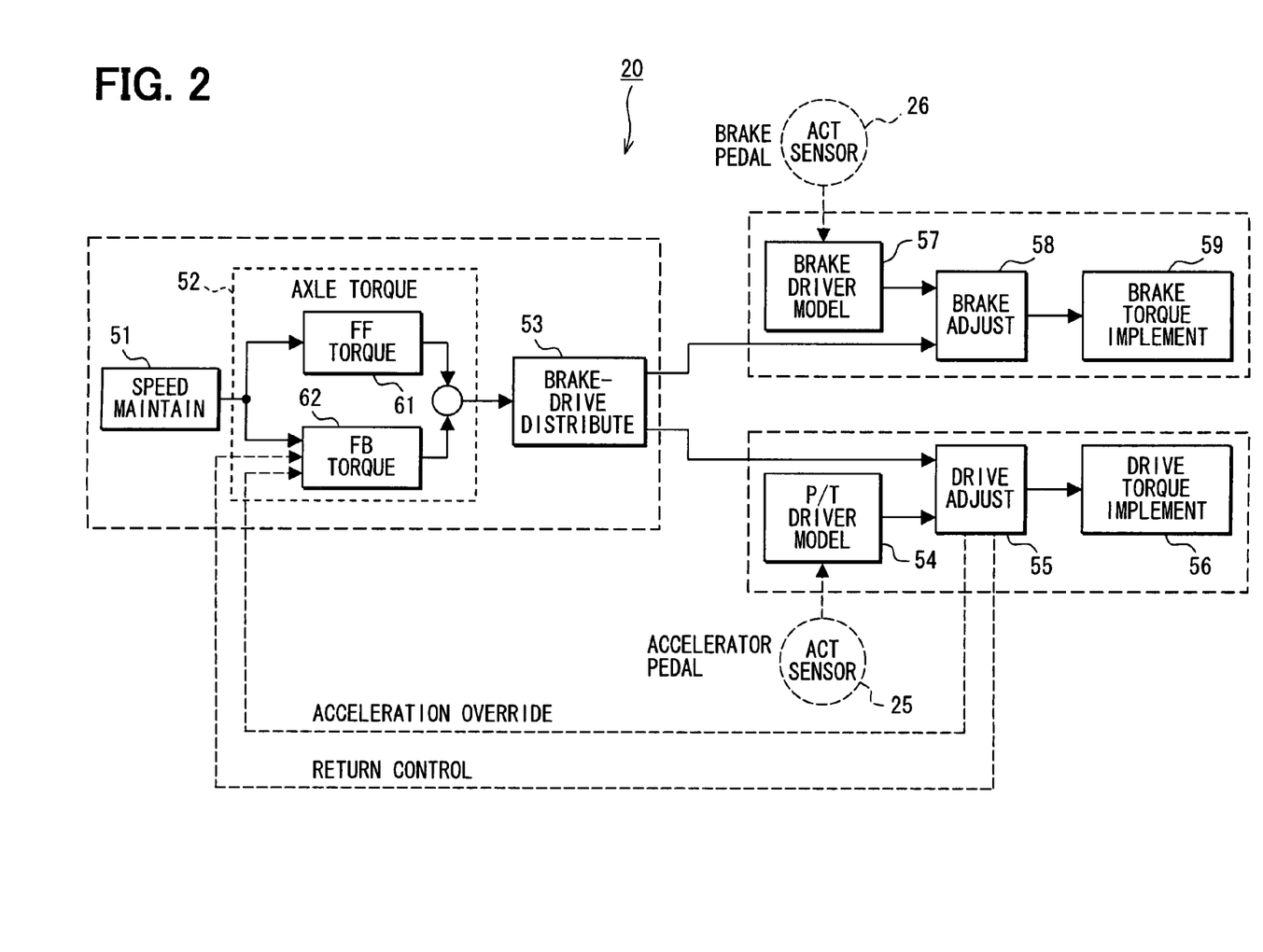
FIG. 2 is a functional block diagram functionally showing a vehicle speed control ECU used in the embodiment.

The vehicle speed control ECU 20 is formed functionally as shown in FIG. 2. As shown in the figure, the vehicle speed control ECU 20 functions as a vehicle speed maintaining calculation unit 51, a desired axle torque generation unit 52, a brake-drive distribution unit 53, a power train (P/T) driver model 54, a drive adjustment unit 55, a drive request torque implementation unit 56, a brake driver model 57, a brake adjustment unit 58, and a brake request torque implementation unit 59.

The vehicle speed maintaining calculation unit 51 calculates a desired acceleration requested to maintain the travel speed of the vehicle to the set speed that is set through the vehicle speed setting switch 24, and the speed and acceleration of the vehicle which are detected by the wheel speed sensor 22.

The desired axle torque generation unit 52 calculates a desired (target) axle torque for realizing a desired acceleration based on the desired acceleration that has been calculated by the vehicle speed maintaining calculation unit 51. More specifically, the desired axle torque generation unit 52 includes an FF torque calculation unit 61 that conducts a feedforward calculation based on the set speed and the travel resistance against the vehicle travel, and an FB torque calculation unit 62 that conducts a feedback calculation based on a difference between the desired acceleration and an actual acceleration. The desired axle torque generation unit 52 adds an FF axle torque that has been calculated by the FF torque calculation unit 61 and an FB axle torque (correction axle torque) that has been calculated by the FB torque calculation unit 62 together to calculate the desired axle torque.

The brake-drive distribution unit 53 distributes the desired axle torque that has been calculated by the desired axle torque generation unit 52 to an engine side and a brake side.

The P/T driver model 54 calculates the axle torque (requested drive axle torque) corresponding to the accelerator operation quantity by the driver which is detected by the accelerator pedal operation quantity sensor 25.

The drive adjustment unit 55 adjusts the desired axle torque that is input from the desired axle torque generation unit 52, and the requested drive axle torque that has been calculated by the P/T driver model 54. More specifically, the drive adjustment unit 55 selects one of the desired axle torque and the requested drive axle torque whichever is larger in the acceleration, and outputs the selected axle torque to the drive request torque implementation unit 56. Also, the drive adjustment unit 55 outputs the acceleration override signal to the FB torque calculation unit 62 in a state where the requested drive axle torque exceeds the desired axle torque. With the above operation, the FB torque calculation unit 62 determines whether the present state is during the acceleration override or not. Also, the drive adjustment unit 55 outputs the acceleration override post-termination return time under-control signal (return control signal) to the FB torque calculation unit 62 since a time point (termination time point of the acceleration override state) when the requested drive axle torque becomes lower than the desired axle torque till a time point when the calculated value of the FB axle torque exceeds (deceleration is reduced) a given limit value that will be described later. With the above operation, the FB torque calculation unit 62 determines whether the present state is under the acceleration override post-termination return time control or not.

The drive request torque implementation unit 56 outputs a control signal for implementing the axle torque that is input from the drive adjustment unit 55 to the engine ECU 30.

The brake driver model 57 calculates the axle torque (requested brake axle torque) corresponding to the brake operation quantity of the driver which is detected by the brake pedal operation quantity sensor 26.

The brake adjustment unit 58 adjusts the desired axle torque that is input from the desired axle torque generation unit 52 and the requested brake axle torque that has been calculated by the brake driver model 57. More specifically, the brake adjustment unit 58 selects one of the desired axle torque and the requested brake axle torque whichever is larger in the deceleration, and outputs the selected axle torque to the brake request torque implementation unit 59.

The brake request torque implementation unit 59 outputs a control signal for implementing the axle torque that has been input from the brake adjustment unit 58 to the brake ECU 40.

The above functional units of the speed control ECU 20 may be realized by a programmed microcomputer.

Figure 3:
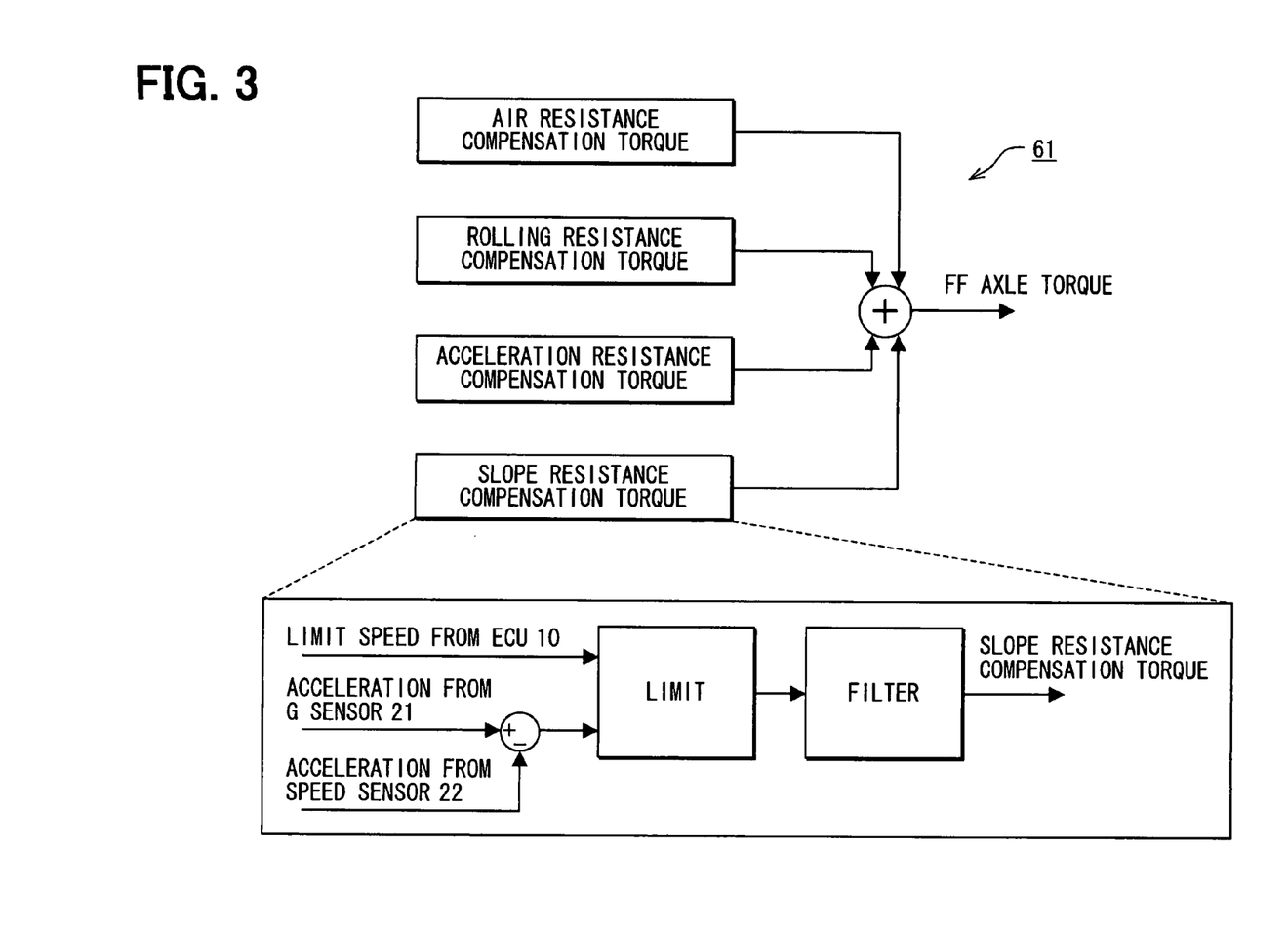
FIG. 3 is an explanatory diagram showing an FF torque calculation unit in the vehicle speed control ECU.

Specifically, as shown in FIG. 3, the FF torque calculation unit 61 may be processing of calculating an air resistance compensation torque, a rolling resistance compensation torque, an acceleration resistance compensation torque, and a slope resistance compensation torque, and add those torques together to calculate the FF axle torque.

The air resistance compensation torque, the rolling resistance compensation torque, and the acceleration resistance compensation torque are calculated as defined by the following Expressions (1) to (3).

$$\text{Air resistance compensation torque} = \rho \times C_d \times A \times v^2 / 2 \quad (1)$$

$$\text{Rolling resistance compensation torque} = \mu \times M \times g \quad (2)$$

$$\text{Acceleration resistance compensation torque} = M \times a \quad (3)$$

In the above Expressions (1) to (3), $\rho$ is an air density [kg/m$^3$], $C_d$ is an air resistance coefficient [–], A is a front projected area of the vehicle [m$^2$], v is a vehicle travel speed [m/s], $\rho$ is a rolling resistance coefficient [–], M is a weight of the vehicle [kg], g is a gravity acceleration [m/s$^2$], and a is a vehicle acceleration [m/s$^2$].

The slope resistance compensation torque is calculated based on a difference (acceleration of the slope) between acceleration (acceleration including a gravity component) which is detected by the G sensor 21 and acceleration (acceleration including no gravity component) which is detected by the wheel speed sensor 22. In order to prevent a small step that exists on the road from being erroneously detected as the slope, and also detect the slope with precision, a limiting process and a filtering process are conducted as shown in FIG. 3 and described below.

First, in the limiting process, it is checked whether the slope that is detected based on the G sensor 21 and the wheel speed sensor 22 can really exist or not based on the Road Construction Ordinance.

That is, the longitudinal slope of the road has an upper limit restricted by a road segment and the design speed of the road (Section 20 of the Road Construction Ordinance). For this reason, when the slope that is detected based on the G sensor 21 and the wheel speed sensor 22 exceeds the upper limit that is determined by the Road Construction Ordinance, it can be determined that the slope temporarily exceed the upper limit due to not the slope but the step.

Also, it is regulated that a longitudinal curve is provided on a portion where the longitudinal slope of the roadway changes, and a radius of the longitudinal curve has a lower limit restricted according to the design speed of the road and the curve form (convex form or concave form) of the longitudinal curve (Section 22 of the Road Construction Ordinance). For this reason, when the radius of the longitudinal curve which is estimated based on a rate of change of the slope which is detected based on the G sensor 21 and the wheel speed sensor 22 becomes lower than the lower limit which is determined according to the Road Construction Ordinance, it can be determined that the slope temporarily becomes lower than the lower limit due to not the slope but the step.

In order to enable the above determinations, the navigation ECU 10 stores the respective limit ranges of the longitudinal slope and the radius of the longitudinal curve which are determined according to the Road Construction Ordinance. More specifically, because the limit range is different according to the design speed (limit speed of the road), the limit range of the travel road is specified based on the information of the limit speed that is input from the navigation ECU 10.

Then, in the limiting process, when it is determined that the detected slope is not included in the limit range which is determined according to the Road Construction Ordinance, a value resulting from multiplying the detected slope value by the limit in the limit range is used as the temporal detected slope which is caused by not the slope but the step. More specifically, for example, when the detected slope value is 10% although the upper limit of the longitudinal slope which is determined according to the Road Construction Ordinance is 5%, the detected slope value is limited to 5% that is the upper limit. That is, the detected slope value out of the limit range which is determined according to the Road Construction Ordinate is corrected to a value closest to the detected slope value within the limit range. In this embodiment, the value obtained by multiplying the detected value by the limit within the limit range is used, but this embodiment is not limited to this value. For example, the detected slope value cannot be used for calculation of the slope resistance compensation torque.

Figure 4:
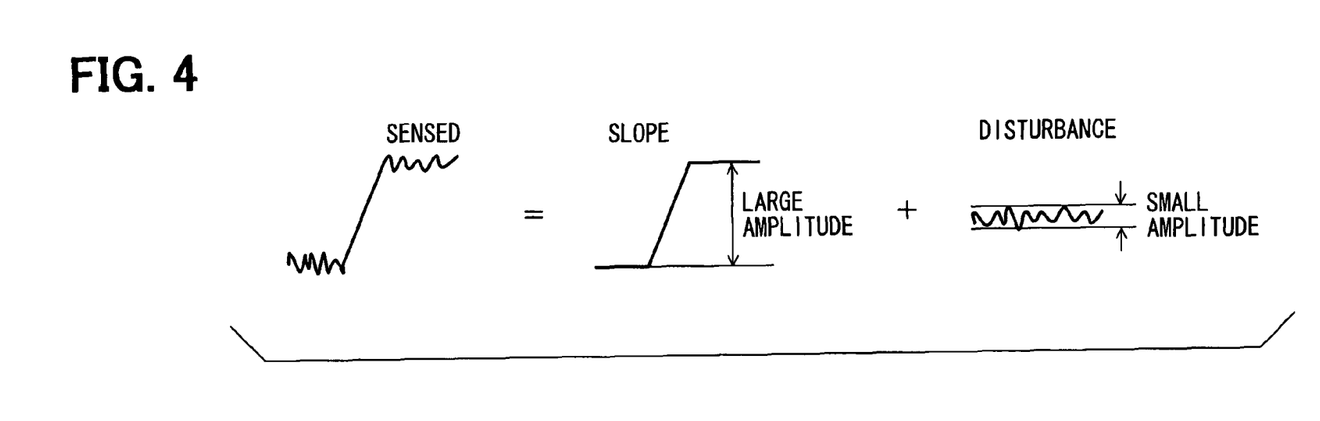
FIG. 4 is an explanatory diagram showing a detected value of a road slope determined in the vehicle speed control ECU.

On the other hand, in the filtering process, a filtering process for removing the noise is conducted on the detected value (detected value of the road slope) that is subjected to the limiting process. That is, as shown in FIG. 4, because disturbances having small amplitudes are included in the detected value (sensed value), the disturbances are removed by the filtering process. In this example, when a time constant of the filtering process is made larger, the effect of removing the noises is enhanced. However, a delay occurs in a change of the slope, and the change is gentle. As a result, a change in the slope cannot be detected with precision. On the contrary, when the time constant of the filtering process is reduced, an influence on the change of the slope can be reduced, but the noises cannot be sufficiently removed. Under the circumstances, the filtering process is conducted with a large time constant on a portion that does not change the slope, and the filtering process is conducted with a small time constant on a portion that changes the slope.

Figure 5:
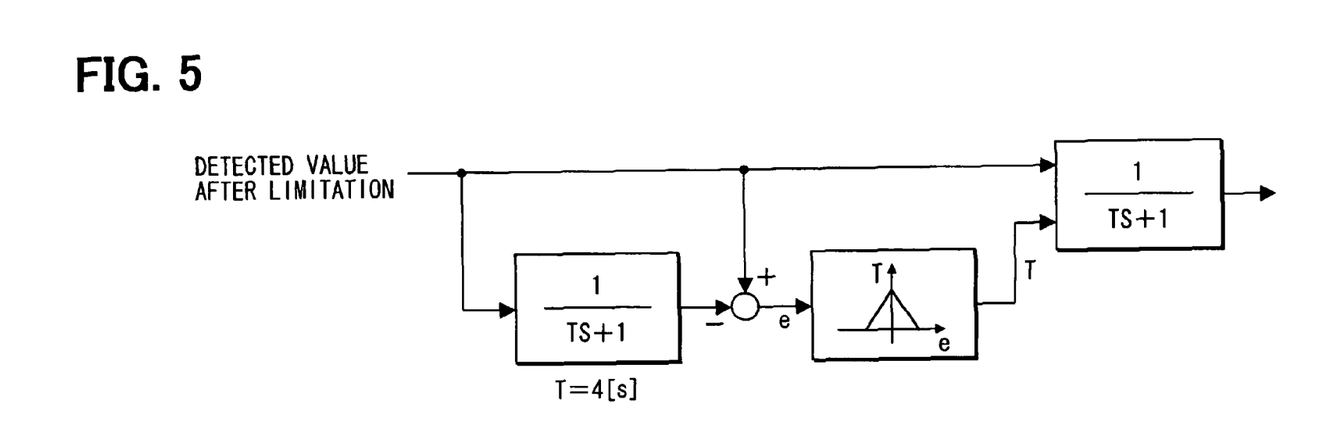
FIG. 5 is an explanatory diagram showing a filtering process in the vehicle speed control ECU.

More specifically, as shown in FIG. 5, there is determined a deviation of the detected value (sensing value) that has been subjected to the limiting process from a value (filter value) obtained by conducting the filtering process (1/(TS+1)) of the large time constant (four seconds in this example) on the detected value. The larger time constant is used as the deviation is smaller. That is, when the deviation is smaller, it is determined that a change in the slope is smaller, and the noises are effectively removed by the filtering process having the larger time constant. When the deviation is larger, it is determined that a change in the slope is larger, and an influence on the change in the slope is suppressed by the filtering process having the smaller time constant. As a result, noises can be effectively removed while suppressing a change in the slope.

With the above limiting process and filtering process, the slope resistance compensation torque is calculated.

Figure 6:
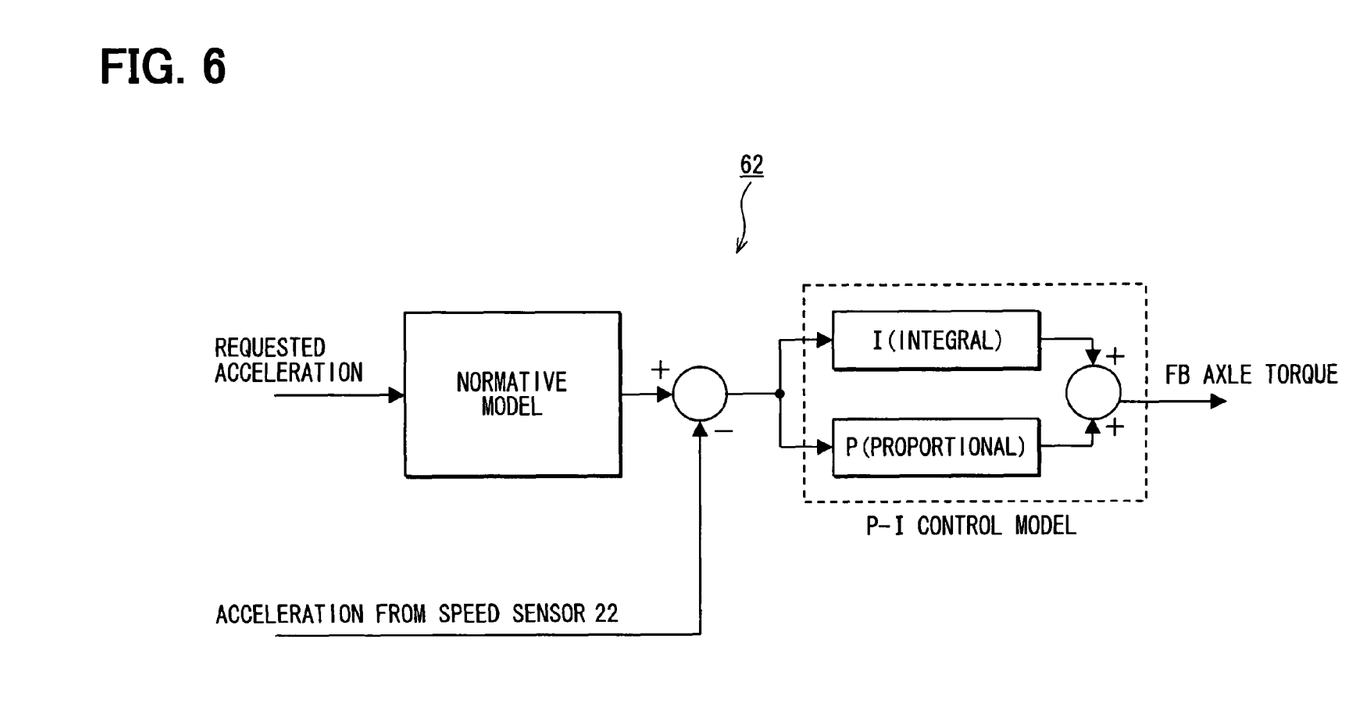
FIG. 6 is an explanatory diagram showing an FB torque calculation unit in the vehicle speed control ECU.

The FB torque calculation unit 62 may be, as shown in FIG. 6, processing of a normative model and a P-I control model. The P-I control model inputs a deviation of an output from the normative model that inputs the requested acceleration from the acceleration from the wheel speed sensor 22, and outputs the FB axle torque.

In the P-I control model, an integral (I) component and a proportional (P) component are calculated, and a sum thereof is output as the FB axle torque.

Figure 7:
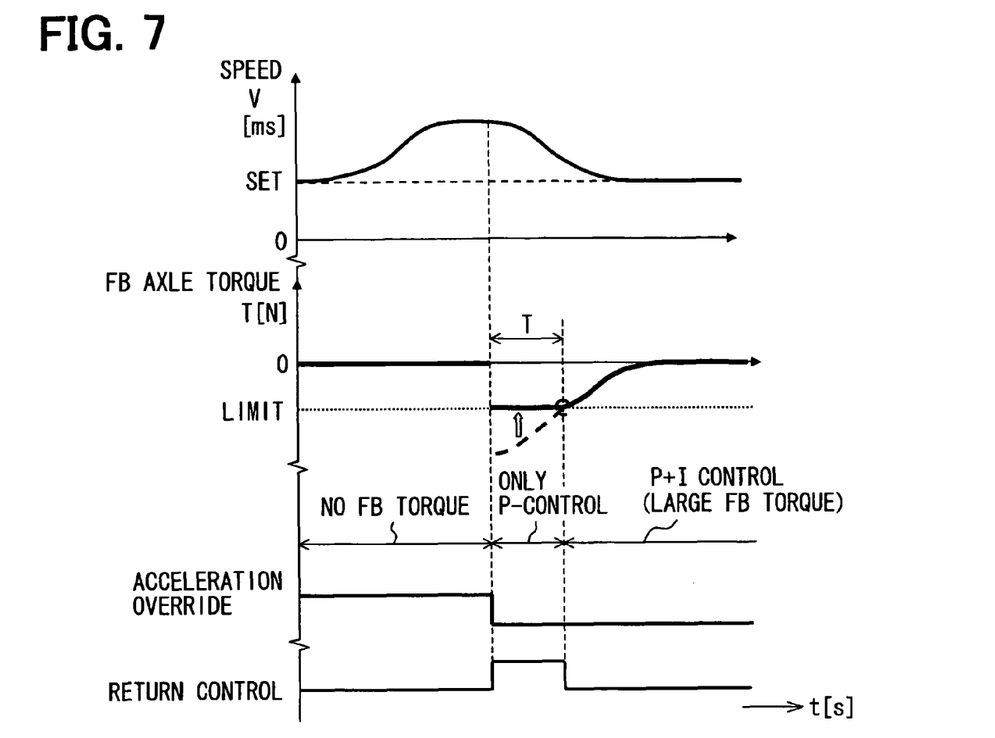
FIG. 7 is an explanatory diagram showing the calculation conditions of an FB axle torque in the vehicle speed control ECU.

As shown in FIG. 7, the calculation in the P-I control mode is interrupted during the acceleration override. That is, a value of the FB axle torque is 0.

Also, the calculation of the proportional component starts at a time when the acceleration override state is terminated, but the calculation of the integral component does not start. That is, the value of the FB axle torque immediately after the acceleration override state is terminated is only the proportional component. When the calculated value of the FB axle torque is equal to or lower than a given limit value (when the deceleration is large), the FB axle torque is limited to the given limit value, and the calculation of the integral component starts at a time when the calculated value reaches the given limit value.

That is, the feedback calculation is canceled during the acceleration override, and only the P control is conducted while the calculated value of the proportional component is larger than the given limit value in the deceleration after the acceleration override. As a result, the integral component is prevented from being accumulated during the acceleration override and during a given period of time T after the termination of the acceleration override.

Figure 8:
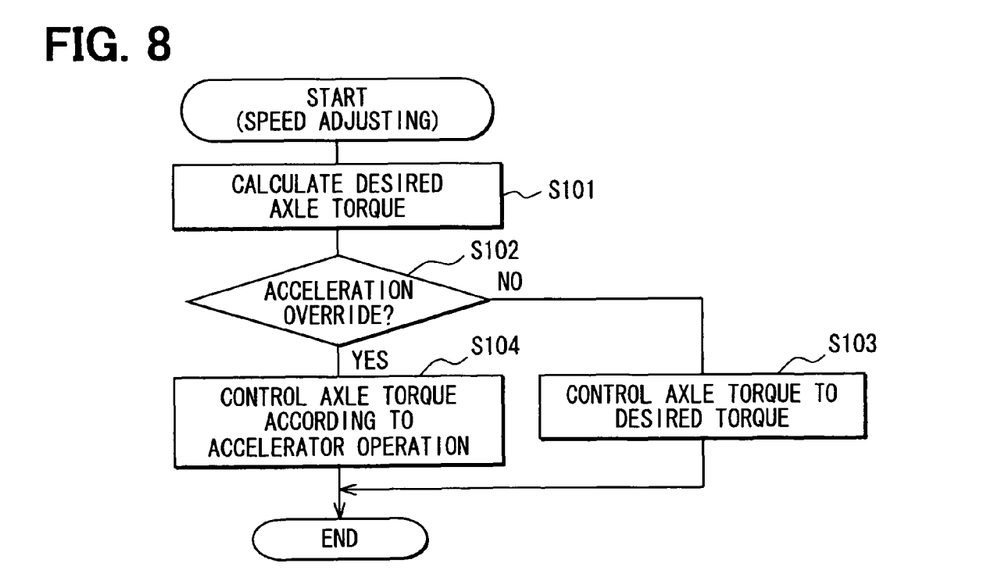
FIG. 8 is a flowchart showing a vehicle speed adjusting process executed in the vehicle speed control ECU.
Figure 9:
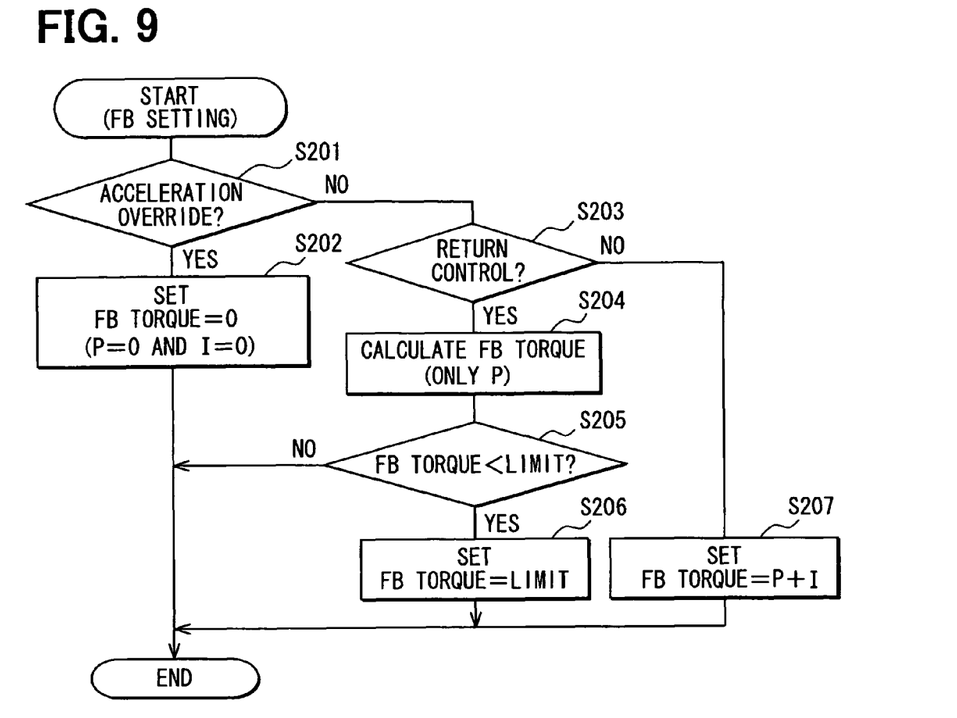
FIG. 9 is a flowchart showing an FB item setting process executed in the vehicle speed control ECU.
Figure 10:
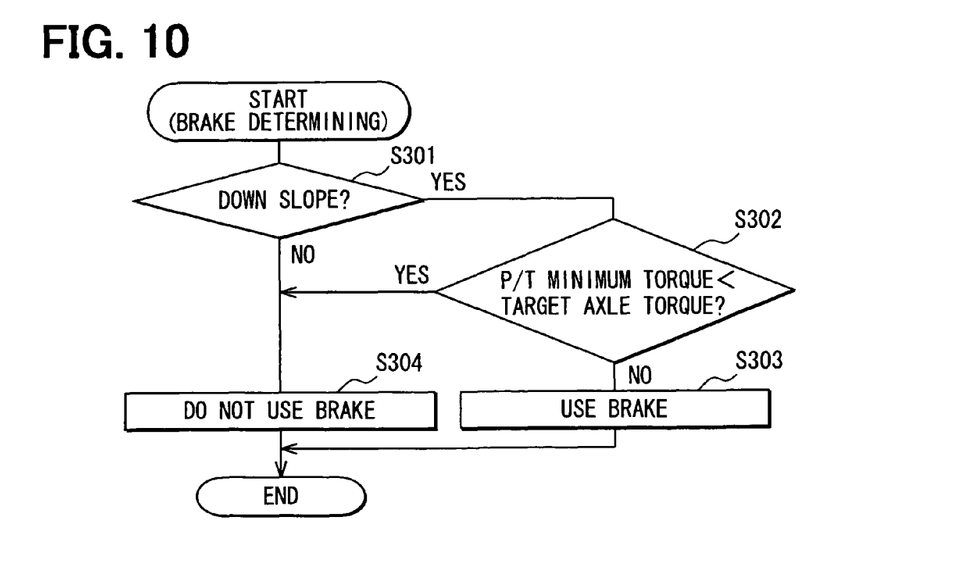
FIG. 10 is a flowchart showing a brake determining process executed in the vehicle speed control ECU.

The vehicle speed control ECU 20 may be programmed to execute the processing shown in FIGS. 8 to 10.

First, a vehicle speed adjusting process that is conducted by the vehicle speed control ECU 20 will be described with reference to the flowchart of FIG. 8. This vehicle speed adjusting process starts by conducting the start operation of the cruise control through the constant speed travel switch 23, and is cyclically executed until the termination operation of the cruise control is conducted.

When the vehicle speed control ECU 20 starts the vehicle speed adjusting process, the vehicle speed control ECU 20 first calculates the desired axle torque in S101. As described above, the desired axle torque includes the feedforward component and the feedback component, and the calculation conditions of the feedback component change according to the state. The change is conducted in a FB item setting process (FIG. 9) which will be described later.

Subsequently, it is checked in S102 whether the present state is during the acceleration override or not. When the requested drive axle torque exceeds the desired axle torque, it is determined that the present state is during the acceleration override.

Then, when it is determined that the present state is not during the acceleration override in S102, the processing proceeds to S103. After the control signal for implementing the desired axle torque that is calculated in S101 is output to the engine ECU 30, this vehicle speed adjusting process is terminated. That is, when the present state is not during the acceleration override, the axle torque of the vehicle is controlled to the desired axle torque, and maintained to the set speed. In a state where the vehicle travels on a sharp descent, the deceleration cannot be conducted to the set speed by only an engine brake. Therefore, the control signal is output to the brake ECU 40. The determination of the state is conducted by a brake determining process (FIG. 10) which will be described later.

On the other hand, when it is determined that the present state is during the acceleration override in S102, the processing proceeds to S104, and the control signal for implementing the requested drive axle torque is output to the engine ECU 30. Thereafter, this vehicle speed adjusting process is terminated. That is, the vehicle is accelerated according to the accelerator operation of the driver.

The FB item setting process is conducted as shown in FIG. 9. Similarly, this FB item setting process starts by conducting the start operation of the cruise control through the constant speed travel switch 23, and is cyclically executed until the termination operation of the cruise control is conducted.

When the vehicle speed control ECU 20 starts the FB item setting process, the vehicle speed control ECU 20 first checks in S201 whether the present state is during the acceleration override or not. More specifically, when the requested drive axle torque exceeds the desired axle torque, it is determined that the present state is during the acceleration override.

Then, when it is determined that the present state is during the acceleration override in S201, the processing proceeds to S202. Then, after the calculation conditions of the FB axle torque are set to the calculation conditions of the acceleration override time, the FB item setting process is terminated. More specifically, the calculation of the FB axle torque is interrupted (P=0 and I=0). That is, the value of the FB axle torque is 0.

On the other hand, when it is determined that the present state is not during the acceleration override in S201, the processing proceeds to S203. It is checked whether the present state is during the acceleration override post-termination return time under-control (return control) or not. The acceleration override post-termination return time control is directed to a control that is conducted from a time (a termination time point of the acceleration override state) when the requested drive axle torque becomes lower than the desired axle torque until a time when the calculated value of the FB axle torque exceeds the given limit value (the deceleration caused by the FB axle torque becomes smaller than the deceleration caused by the given limit value).

When it is determined that the present state is during the acceleration override post-termination return time control in S203, the processing proceeds to S204, and the calculation conditions of the FB axle torque are set to the calculation conditions immediately after the acceleration override. More specifically, the proportional component P is calculated, but the integral component I is not calculated.

Subsequently, it is checked in S205 whether the value of the FB axle torque is lower than the given limit value (the deceleration caused by the FB axle torque is larger than the deceleration caused by the given limit value) or not.

When it is determined that the value of the FB axle torque is not lower than the given limit value in S205, this FB item setting process is terminated.

On the other hand, when it is determined that the value of the FB axle torque is lower than the given limit value, the processing proceeds to S206. After the value of the FB axle torque is set to the given limit value, this FB item setting process is terminated. That is, when the value of the FB axle torque is equal to or lower than the given limit value (the deceleration is larger), the value of the FB axle torque is limited to the given limit value.

When it is determined that the present state is not during the acceleration override post-termination return time control in S203, the processing proceeds to S207. After the calculation conditions of the FB axle torque are set to the normal calculation conditions (proportional component P+integral component I), this FB item setting process is terminated.

The brake determining process is conducted as shown in FIG. 10. This brake determining process is cyclically executed during the cruise control.

When the vehicle speed control ECU 20 starts the brake determining process, the vehicle speed control ECU 20 first checks in S301 whether a road on which the vehicle is traveling is a down-slope (descent) or not. The determination of whether the road is the decent or not can be conducted, for example, based on a difference between the acceleration that is detected by the G sensor 21 and the acceleration that is detected by the wheel speed sensor 22.

Then, when it is determined that the travel road is the descent in S301, the processing proceeds to S302, and it is checked whether the minimum torque that can be realized by a power train (P/T) is lower than the desired axle torque or not. That is, it is checked whether the present state is a state in which the speed of the vehicle can be reduced down to the set speed by only the engine braking or not.

Then, when the minimum torque that can be realized by the power train is not lower than the desired axle torque in S302, the processing proceeds to S303, and the present mode is set to a mode that uses the brake in order to realize the desired axle torque. That is, the control signal for realizing the desired axle torque is output to the brake ECU 40. Thereafter, this brake determining process is terminated.

On the other hand, when it is determined that the travel road is not the descent in S301, or when it is determined that the minimum torque that can be realized by the power train is lower than the desired axle torque in S302, the processing proceeds to S304. The present mode is set to a mode that does not use the brake in order to realize the desired axle torque. Thereafter, this brake determining process is terminated.

The vehicle speed control device according to this embodiment provides the following advantages.

Figure 11:
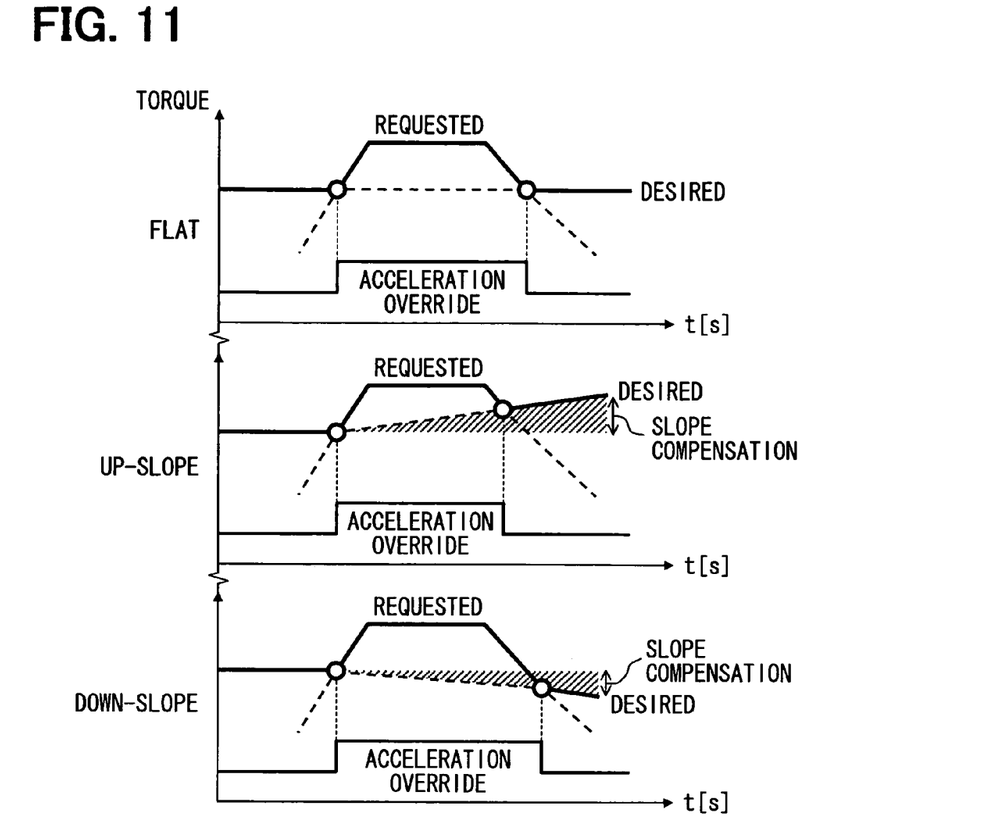
FIG. 11 is an explanatory diagram showing a restart time of a cruise control when a travel resistance changes during acceleration override in the embodiment.
Figure 12:
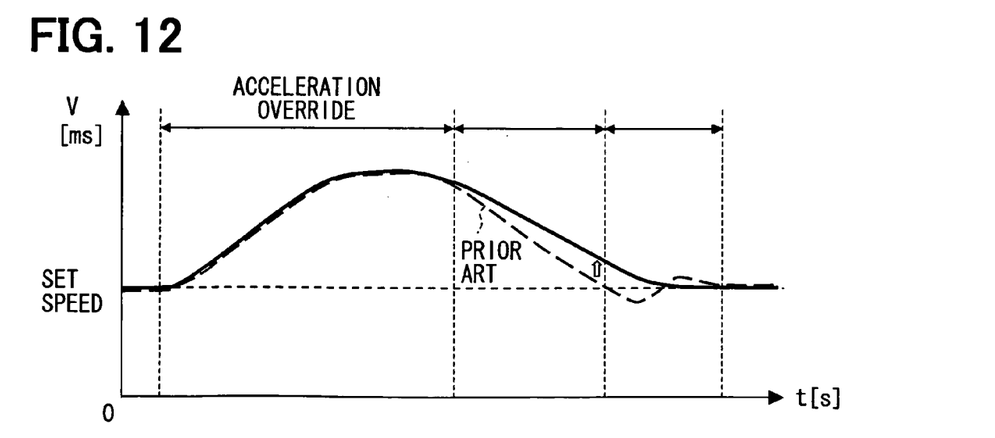
FIG. 12 is an explanatory diagram showing a speed reduction control in the embodiment compared with a conventional control.

The acceleration override state is canceled to restart the cruise control at a time when the requested drive axle torque that is requested by the accelerator operation during the acceleration override becomes lower than the desired axle torque which is calculated by the feedforward calculation based on the travel resistance. For this reason, as shown in FIG. 11, even when the travel resistance changes during the acceleration override, the cruise control restarts at an appropriate time corresponding to the travel resistance (for example, an early time when the road is an up-slope (ascent), and a later time when the road is a down-slope (descent). Moreover, the desired axle torque at the time of restart is appropriate according to the travel resistance. Accordingly, as shown in FIG. 12, the hunting of the vehicle speed V is liable to occur at the time of deceleration after the acceleration override state is canceled in the conventional control (broken line). On the contrary, in the control of this embodiment (solid line), the deceleration is smoothly conducted without hunting.

When the detected value of the road slope is not included in the limit range which is established by the Road Construction Ordinance, the detected slope value is limited within the limit range, thereby making it possible to make the calculation results of the desired axle torque more appropriate.

Because the filtering process for removing the noises from the detected value of the road slope is conducted, the slope of the road can be detected with high precision. In particular, the filtering process is conducted with the large time constant on a portion that does not change the slope, and the filtering process is conducted with the small time constant on a portion that changes the slope. As a result, the noises can be effectively removed while a change in the slope is suppressed.

Because the FB axle torque immediately after the override is limited to the given limit value, a sharp deceleration can be prevented even in a state where the vehicle speed deviation is large, and the gentle and smooth shift can be attained.

Because the calculation of the integral component is interrupted during a period of the override and a period in which the FB axle torque is limited to the given limit value after the override, the calculated value of the integral component can be prevented from being excessively accumulated.

When the minimum torque that can be realized by the power trains is equal to or higher than the desired axle torque, that is, when it is determined that the speed of the vehicle cannot be reduced to the set speed by only the engine brake), the brake is used. As a result, the vehicle can be surely decelerated even on the steep down-slope.

In the above embodiment, it is noted that the vehicle speed control ECU 20 includes a drive force calculating means (51-53) by executing the processing of S101 in the vehicle speed adjusting process (FIG. 8) and the processing of the FB item setting process (FIG. 9). Also, the vehicle speed control ECU 20 includes a cruise control means (54-59) by executing the processing of S102 to S105 in the vehicle speed adjusting process (FIG. 8) and the processing of the brake determining process (FIG. 10).

The above embodiment may be modified in many ways. For instance, although the feedforward calculation is conducted with the air resistance, the rolling resistance, the acceleration resistance and the slope resistance as the travel resistance, only a part of those resistances may be used as the travel resistance, or other additional travel resistances may also be taken into consideration.

What is claimed is:

1. A vehicle speed control device comprising:
   means for calculating a control drive force for maintaining a speed of a vehicle to a set speed; and
   means for conducting a cruise control which makes the vehicle travel by the control drive force calculated by the calculating means,
   wherein the calculating means calculates a drive force including a feedforward component corresponding to the set speed and a travel resistance against travel of the vehicle, and a feedback component corresponding to a deviation between the set speed and an actual speed of the vehicle as the control drive force,
   wherein the conducting means interrupts the cruise control when accelerator operation is conducted by a driver during the cruise control, and a requested drive force requested by the accelerator operation exceeds the control drive force, and restarts the cruise control at a time when the requested drive force becomes lower than the control drive force,
   wherein the calculating means detects at least a slope of a road on which the vehicle travels as the travel resistance,
   the calculating means checks whether a detected value of the slope is within a limit range that is defined by Law or Regulation, and uses no detected value in the calculation of the feedforward component or uses a value that is limited within the limit range, and
   wherein the limit range is stored in a navigation ECU;
   wherein the calculating means interrupts the calculation of the feedback component while the requested drive force exceeds the control drive force, and
   wherein the calculating means calculates a proportional component and an integral component as the feedback component, restarts only the calculation of the proportional component at a time when the requested drive force becomes lower than the control drive force after exceeding the control drive force, limits the feedback component to a limit deceleration until the deceleration corresponding to the calculation result of the proportional component becomes lower than a given limit deceleration, and cancels the limit and restarts the calculation of the integral component at a time when the deceleration becomes lower than the limit deceleration.

2. The vehicle speed control device according to claim 1, wherein the calculating means conducts a filtering process for removing noises from the detected value of the slope.

3. The vehicle speed control device according to claim 2, wherein the filtering process is conducted with a filter time constant as a deviation of a value when the detected value of the slope is filtered with a given time constant.

4. The vehicle speed control device according to claim 1, wherein the conducting means generates a brake force in a brake device when it is determined that the speed of the vehicle cannot be reduced to the set speed by only an engine brake.

5. The vehicle speed control device according to claim 4, wherein the conducting means determines that the speed of the vehicle cannot be reduced to the set speed by only the engine brake when a minimum torque that can be realized by a power train is equal to or higher than a torque corresponding to the control drive force.

6. A vehicle speed control method comprising:
calculating a control drive force including a feedforward component corresponding to a set speed and a travel resistance against travel of a vehicle, and a feedback component corresponding to a deviation of the set speed from an actual speed of the vehicle, which is a control drive force for maintaining a speed of the vehicle to the set speed;
conducting a cruise control for making the vehicle travel by the control drive force;
interrupting the cruise control when an accelerator operation is conducted by a driver during the cruise control and a requested drive force that is requested by the accelerator operation exceeds the control drive force;
restarting the cruise control at a time when the requested drive force becomes lower than the control drive force after a termination of the accelerator operation;
detecting at least a slope of a road on which the vehicle travels as the traveling resistance;
checking whether a detected value of the slope is within a limit range that is defined by Law or Regulation;
using no detected value in the calculation of the feedforward component or using a value that is limited within the limit range; and
storing the limit range in a navigation ECU; wherein the calculating means interrupts the calculation of the feedback component while the requested drive force exceeds the control drive force, and
wherein the calculating means calculates a proportional component and an integral component as the feedback component, restarts only the calculation of the proportional component at a time when the requested drive force becomes lower than the control drive force after exceeding the control drive force, limits the feedback component to a limit deceleration until the deceleration corresponding to the calculation result of the proportional component becomes lower than a given limit deceleration, and cancels the limit and restarts the calculation of the integral component at a time when the deceleration becomes lower than the limit deceleration.

7. A vehicle speed control device comprising:
means for calculating a control drive force for maintaining a speed of a vehicle to a set speed; and
means for conducting a cruise control which makes the vehicle travel by the control drive force calculated by the calculating means,
wherein the calculating means calculates a drive force including a feedforward component corresponding to the set speed and a travel resistance against travel of the vehicle, and a feedback component corresponding to a deviation between the set speed and an actual speed of the vehicle as the control drive force,
wherein the conducting means interrupts the cruise control when accelerator operation is conducted by a driver during the cruise control, and a requested drive force requested by the accelerator operation exceeds the control drive force, and restarts the cruise control at a time when the requested drive force becomes lower than the control drive force,
wherein the calculating means interrupts the calculation of the feedback component while the requested drive force exceeds the control drive force; and
wherein the calculating means calculates a proportional component and an integral component as the feedback component, restarts only the calculation of the proportional component at a time when the requested drive force becomes lower than the control drive force after exceeding the control drive force, limits the feedback component to a limit deceleration until the deceleration corresponding to the calculation result of the proportional component becomes lower than a given limit deceleration, and cancels the limit and restarts the calculation of the integral component at a time when the deceleration becomes lower than the limit deceleration.

* * * * *